United States Patent [19]
Conrad et al.

[11] Patent Number: 4,726,659
[45] Date of Patent: Feb. 23, 1988

[54] DISPLAY DEVICE HAVING DIFFERENT ALIGNMENT LAYERS

[75] Inventors: Neal D. Conrad, Ewing Township, Mercer County; Sandra K. McClelland, Bordentown Township, Burlington County; William R. Roach, Rocky Hill, all of N.J.

[73] Assignee: RCA Corporation, Princeton, N.J.

[21] Appl. No.: 832,214

[22] Filed: Feb. 24, 1986

[51] Int. Cl.$^4$ .................................. G02F 1/13
[52] U.S. Cl. ........................ 350/341; 350/340
[58] Field of Search ..................... 350/340, 341

[56] References Cited

U.S. PATENT DOCUMENTS

| | | | |
|---|---|---|---|
| 3,989,354 | 11/1976 | Dubois et al. | 350/340 |
| 4,128,313 | 12/1978 | Cole, Jr. et al. | 350/340 |
| 4,165,922 | 8/1979 | Morrissy | 350/340 |
| 4,247,174 | 1/1981 | Walter | 350/340 |
| 4,277,144 | 7/1981 | Sauer et al. | 350/340 |
| 4,381,886 | 5/1983 | Yokokura et al. | 350/341 |
| 4,437,731 | 3/1984 | Sudo et al. | 350/340 |

Primary Examiner—Stanley D. Miller
Assistant Examiner—Trong Quang Phan
Attorney, Agent, or Firm—E. M. Whitacre; D. H. Irlbeck; L. L. Hallacher

[57] ABSTRACT

A display device, such as an LCD, has alignment layers made of different materials; thus one layer can have a low curing temperature so as not to cause damage to delicate organic layers, such as a color filter, during curing, while the other layer can have a larger tilt angle so as to minimize ambiguities in the liquid crystal material.

8 Claims, 1 Drawing Figure

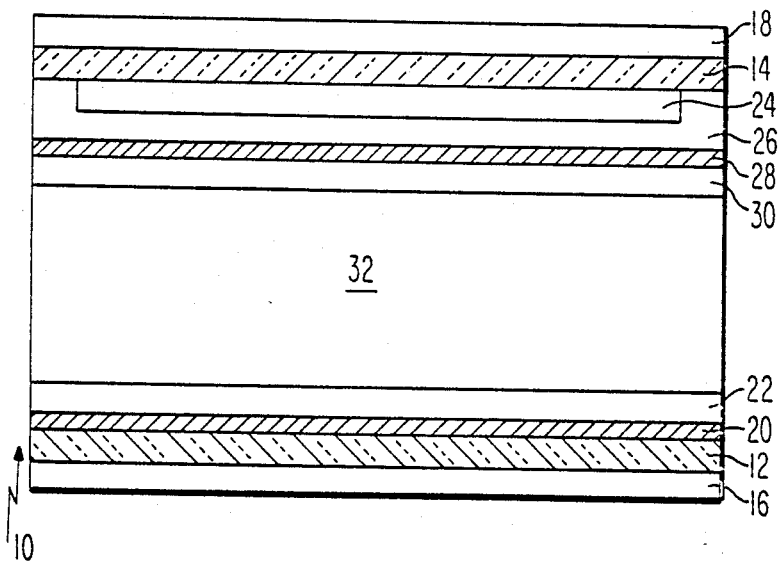

DISPLAY DEVICE HAVING DIFFERENT ALIGNMENT LAYERS

BACKGROUND OF THE INVENTION

The present invention relates to a liquid crystal display (LCD), and more particularly to such a display wherein each of the alignment layers is made of a different material.

A LCD comprises a pair of substrates with one or more electrodes on each substrate. An alignment layer overlies each electrode, and a polarizing layer is disposed on the outside of each of the substrates. Further, for a color LCD, a color filter overlies one substrate enclosed in an encapsulating layer lying between the electrode and the substrate. A liquid crystal material (LCM) is disposed between the alignment layers. The alignment layers align the LCM to a selected "tilt angle", which is the angle between the longitudinal axis of a liquid crystal molecule and the plane of the alignment layer. The alignment layers cannot require a cure temperature that is so high that damage to the drive electronics and the color filter can result. While low curing temperature alignment materials exist, they also have a low tilt angle. A low value for the tilt angle can result in ambiguities in the way the LCM aligns with the layer and a long response time. By "ambiguities" is meant that different portions of the LCM within an LCD align with different optical rotations. Further, some alignment materials allow ionic migration from the substrate into the LCM.

It is therefore desirable to have an LCD whose alignment layers do not require a curing temperature that damages the electronics or color filters during fabrication, have a minimum of twist ambiguities, and minimize ionic migration.

SUMMARY OF THE INVENTION

A display device comprises a pair of opposing substrates each having an electrode thereon; and a pair of alignment layers overlying said electrodes, respectively, each layer comprising a different material than the remaining layer.

BRIEF DESCRIPTION OF THE DRAWING

The sole FIGURE is a cross-sectional view of a LCD which incorporates the principles of the invention.

DETAILED DESCRIPTION OF THE PREFERRED EMBODIMENTS

The FIGURE shows a portion of an LCD 10 comprising first and second substrates 12 and 14. First and second polarizing layers 16 and 18 are disposed on the outer surfaces of the substrates 12 and 14, respectively. A first electrode 20 overlies the substrate 12, and a first alignment layer 22 overlies the electrode 20. Adjacent the second substrate 14 is a color filter 24 enclosed in an encapsulating layer 26. A second electrode 28 lies adjacent the encapsulating layer 26, while a second alignment layer 30 overlies the second electrode 28. Between the alignment layers 22 and 30 is LCM 32. For active matrix LCDs, the plane of the first electrode 20 typically also comprises the active drive element, such as a diode or a transistor (not shown), and addressing lines (not shown), all as known in the art. If desired, the active element can be disposed in the plane of the second electrode 28.

The substrates 12 and 14 can be of a transparent material such as glass, fused quartz, or plastic. The electrodes 20 and 28 can be made of a transparent conductive layer such as tin oxide or indium tin oxide of about 200 nanometers (nm) in thickness. The color filter 24 can comprise an organic dye or a pigment, while the encapsulating layer 26 can be a transparent organic polymer, such as methylmethacrylate. The LCM 32 can be a twisted nematic type such as a mixture of phenylcyclohexane, biphenylcyclohexane and cyclohexylbiphenylcyclohexane, made by the E. Merck Co., Rahway, N.J., as "ZLI2293".

The first alignment layer 22 can be made of a polyimide of about 100 nm in thickness to block ion migration and having a relatively high, about 250° C., cure temperature. The second alignment layer 30 can be made of a low cure temperature material, for example, a monomolecular layer of an organosilane, such as N-methylaminopropyltrimethoxy silane, which has a cure temperature of about 90° C. This avoids the possibility of damage to the filter 24 during curing. The polarizing layers 16 and 18 can comprise polyvinylalcohol doped with iodine.

Each of the substrates 12 and 14, together with their respective layers are separately cured, rubbed, and assembled. Then the edges are sealed in known manner leaving a space and the LCM 32 introduced into the space therebetween. Finally the fill hole (not shown) is sealed in known manner.

EXAMPLE

An LCD was made using the materials given above, i.e. a polyimide for the first alignment layer 22 and an organosilane for the second alignment layer 30. The tilt angle was measured using the technique disclosed in the article "Accurate Optical Measurement of Small Tilt Angles in Thin Twisted Nematic Layers", by H. Birecki and F. J. Kahn, in the book "The Physics and Chemistry of Liquid Crystal Devices", G. F. Sprokel, Plenum Press, N.Y. 1980. An average tilt angle of about 0.5 to 0.6 degree was obtained for the LCM 32, which was found by visual inspection to be sufficiently large to eliminate ambiguities.

COUNTER EXAMPLE NO. 1

In contradistinction to the example above, an LCD was made wherein both of the alignment layers 22 and 30 comprise the same material, the organosilane. The average tilt angle was found to be about 0.3 degree, which resulted in ambiguities in the liquid crystal material layer.

COUNTER EXAMPLE NO. 2

When both of the alignment layers 22 and 30 comprise a polyimide, a tilt angle for the LCD of 2 to 3 degrees was obtained. This was sufficient to eliminate ambiguities in the LCM 32. However, the high cure temperature would degrade the color filter 24.

What is claimed is:

1. A display device comprising:
   first and second opposing substrates having first and second electrodes respectively thereon; and
   first and second alignment layers overlying said first and second electrodes, respectively, each of said first and second alignment layers comprising a different material.

2. The device of claim 1, wherein said substrates comprise a transparent material.

3. The device of claim 1, wherein said electrodes comprise a transparent conductive layer.

4. The device of claim 1, wherein said alignment layers have different cure temperatures.

5. The device of claim 4, further comprising a color filter adjacent the alignment layer having the lower cure temperature.

6. The device of claim 4, wherein said first alignment layer comprises a polyimide and said second alignment layer comprises an organosilane.

7. The device of claim 1, further comprising a liquid crystal material disposed between said substrates.

8. The device of claim 1, further comprising a pair of polarizing layers adjacent said substrates, respectively, on the surface opposite said electrodes.

* * * * *

REEXAMINATION CERTIFICATE (1250th)
United States Patent [19]
Conrad et al.

[11] B1 4,726,659
[45] Certificate Issued  Apr. 10, 1990

[54] DISPLAY DEVICE HAVING DIFFERENT ALIGNMENT LAYERS

[75] Inventors: Neal D. Conrad, Ewing Township, Mercer County; Sandra K. McClelland, Bordentown Township, Burlington County; William R. Roach, Rocky Hill, all of N.J.

[73] Assignee: RCA Corporation

Reexamination Request:
No. 90/001,718, Feb. 21, 1989

Reexamination Certificate for:
Patent No.: 4,726,659
Issued: Feb. 23, 1988
Appl. No.: 832,214
Filed: Feb. 24, 1986

[51] Int. Cl.⁴ .................................................. G02F 1/13
[52] U.S. Cl. ...................................... 350/341; 350/340
[58] Field of Search .................... 350/340, 341, 339 F

[56] References Cited

U.S. PATENT DOCUMENTS

4,469,408  9/1984  Kruger et al. ................. 350/340
4,618,514  10/1986  McClelland et al. .......... 350/341

FOREIGN PATENT DOCUMENTS

0152827  8/1985  European Pat. Off. ........ 350/339 F
0168242  1/1986  European Pat. Off. .
2109123  5/1983  United Kingdom .
2121226  12/1983  United Kingdom .
2138196  10/1984  United Kingdom .
2143336  2/1985  United Kingdom .

*Primary Examiner*—S. D. Miller

[57] ABSTRACT

A display device, such as an LCD, has alignment layers made of different materials; thus one layer can have a low curing temperature so as not to cause damage to delicate organic layers, such as a color filter, during curing, while the other layer can have a larger tilt angle so as to minimize ambiguities in the liquid crystal material.

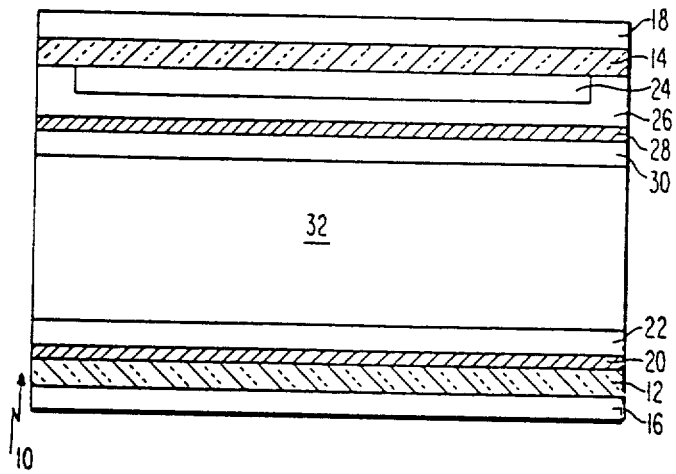

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *